United States Patent [19]

Tokuno et al.

[11] 4,020,406

[45] Apr. 26, 1977

[54] WEB CUTTING CONTROL SYSTEM

[75] Inventors: Masateru Tokuno, Nishinomiya; Masayuki Matsuura, Yokohama; Noboru Shinmura, Yokohama; Masayoshi Kaneko, Yokohama, all of Japan

[73] Assignees: Rengo Kabushiki Kaisha; Nippon Riraiansu Kabushiki Kaisha, both of Japan

[22] Filed: May 29, 1975

[21] Appl. No.: 582,406

[30] Foreign Application Priority Data

June 7, 1974 Japan .................. 49-65416
Aug. 16, 1974 Japan .................. 49-95260

[52] U.S. Cl. .................. 318/600; 83/74; 83/76; 318/603

[51] Int. Cl.² .................. G05B 19/26; B26D 5/20; B26D 5/40

[58] Field of Search .................. 318/603, 39, 600; 83/37, 71, 74, 76, 72, 73

[56] References Cited

UNITED STATES PATENTS

| | | | |
|---|---|---|---|
| 3,181,403 | 5/1965 | Sterns et al. | 318/600 X |
| 3,604,300 | 9/1971 | Allison et al. | 83/76 |
| 3,668,957 | 6/1972 | Nido | 83/71 X |
| 3,706,248 | 12/1972 | Erhart | 83/74 |
| 3,730,810 | 5/1973 | Klein | 83/74 X |
| 3,870,936 | 3/1975 | Coberly | 318/603 |

*Primary Examiner*—Robert J. Hickey
*Attorney, Agent, or Firm*—Wenderoth, Lind & Ponack

[57] ABSTRACT

A web cutting control system controlling the speed of a rotary cutter for automatic, continuous and precise cutting of a web fed at a constant speed into predetermined lengths or on the marks on the web. Two transducers generate pulses the number of which corresponds to the web feed length and the rotating angle of the rotary cutter, respectively. Three sensors detect the marks on the web, the completion of cutting, and the arrival of the cutter blades, respectively, to control the flow of signals. A desired cutting length or the distance between the mark detection point and the point of completion of cutting is preset. A reversible counter receives the pulses from these two transducers and the difference signal between the preset value and a reference signal and performs reversible counting thereof, the result of which is used to control the speed of motor for the rotary cutter to bring its speed into synchronization with the web feed speed for accurate cutting.

1 Claim, 21 Drawing Figures

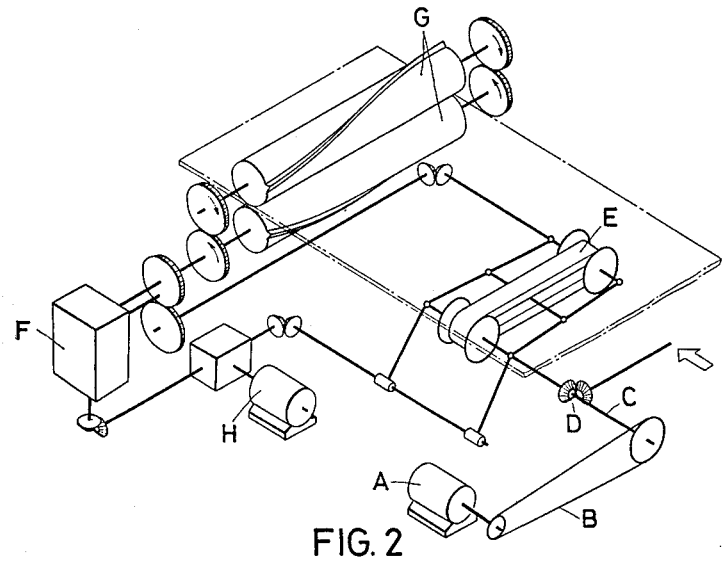
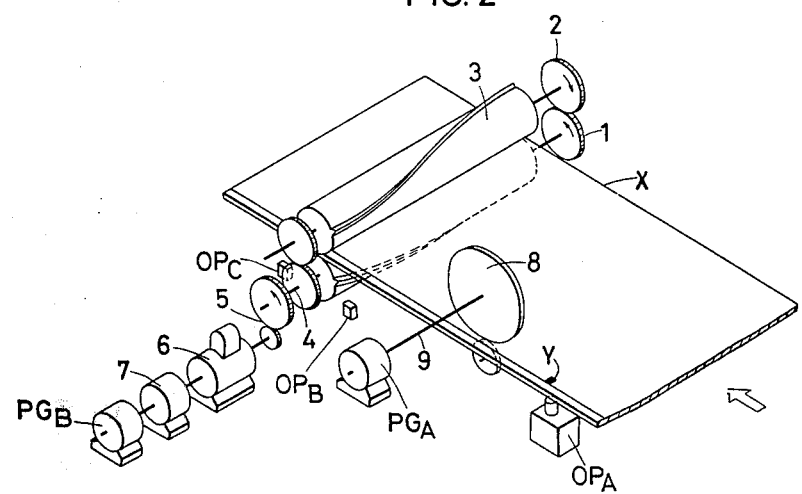
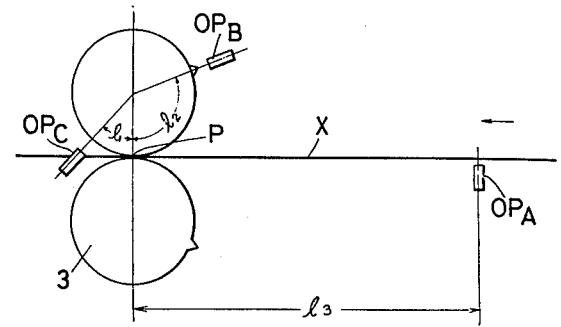

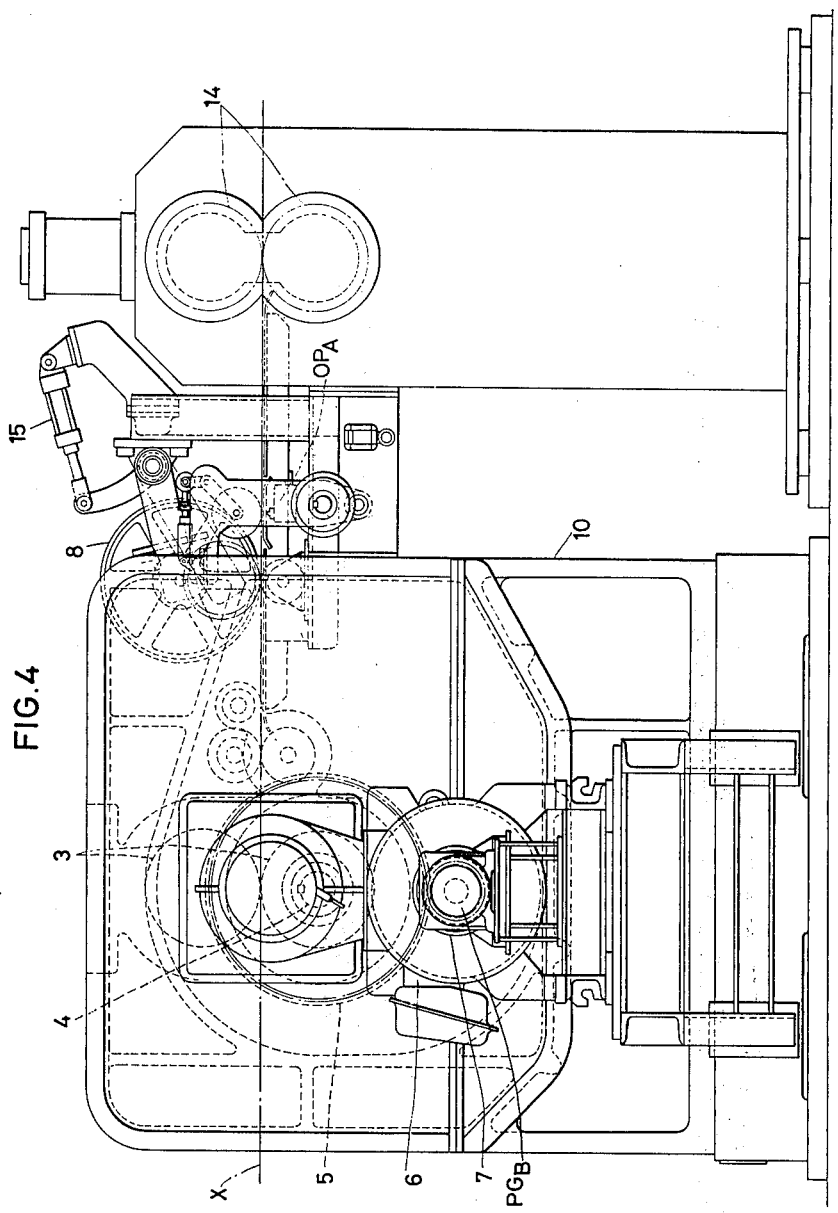

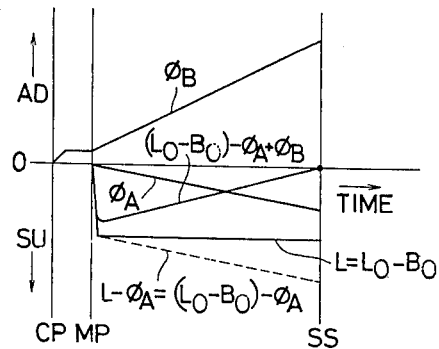
FIG.8
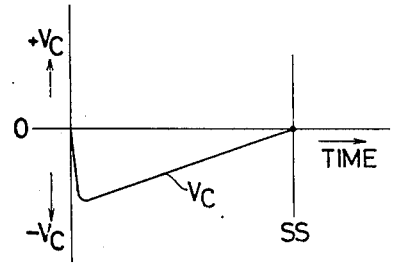
FIG.9-a
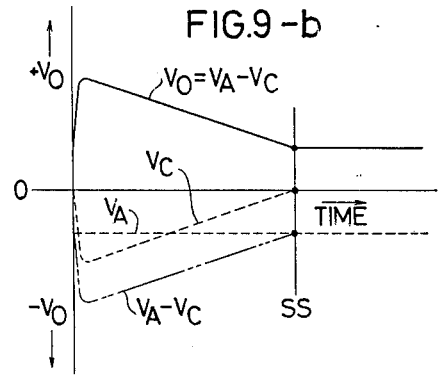
FIG.9-b
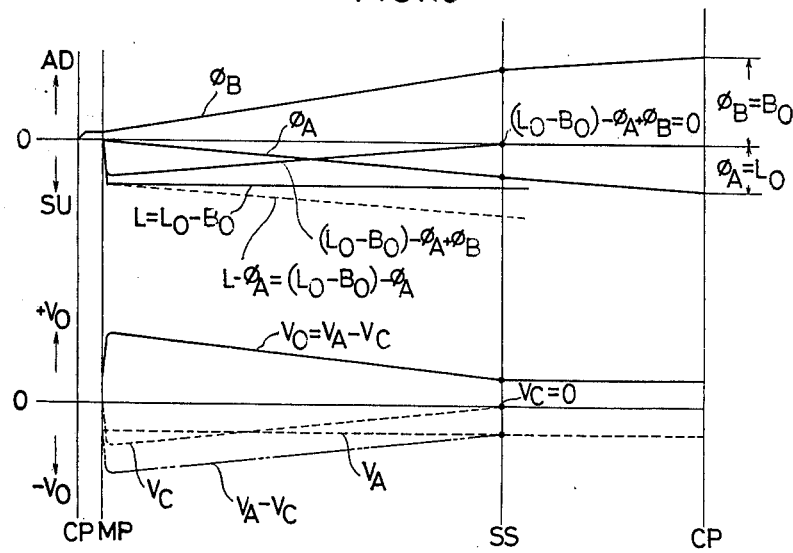
FIG.10

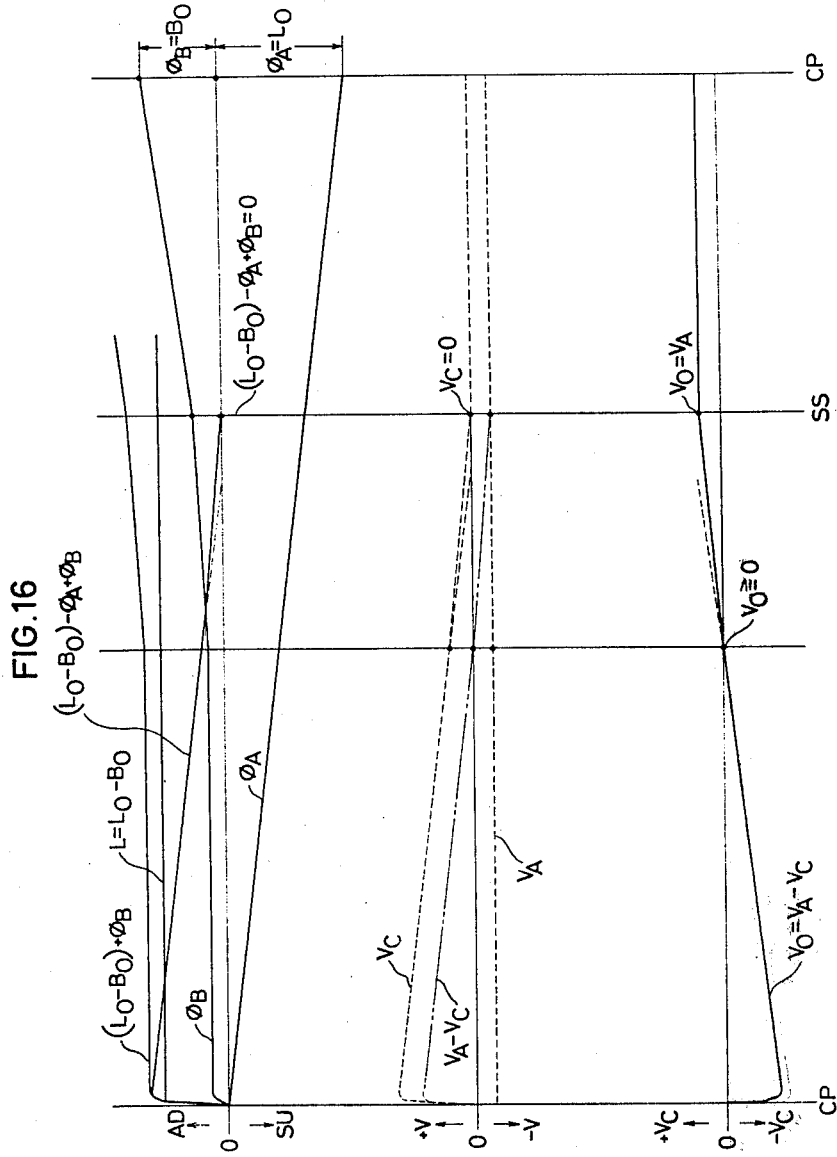

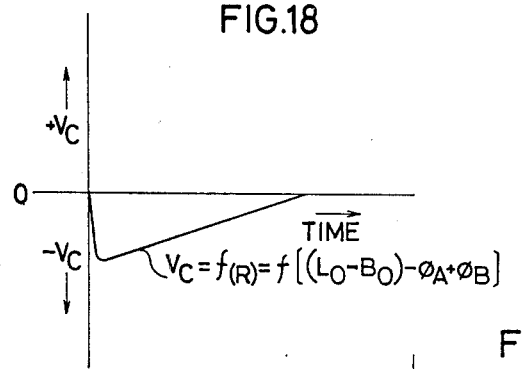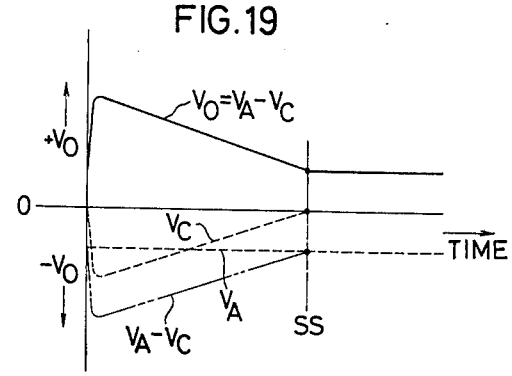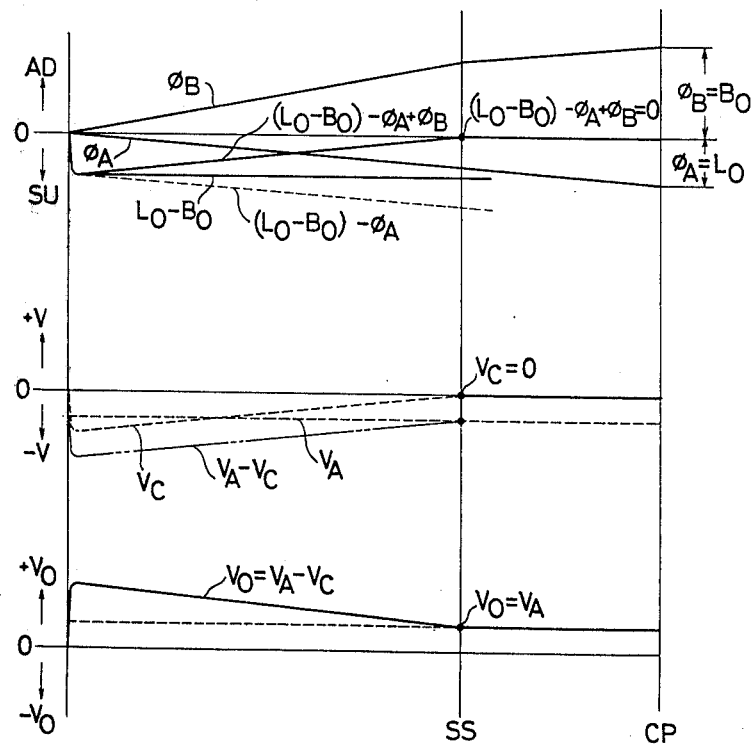

WEB CUTTING CONTROL SYSTEM

The present invention relates to a control system which provides an automatic, continuous and accurate cutting of a web of continuously conveyed cardboard or the like by means of a rotary cutter into constant lengths or at fixed positions without stopping the flow of web at the instant of cutting, with the speed of the rotary cutting being brought into synchronization with the speed at which the web is being fed.

In the cutting of a web continuously fed at a constant speed into desired lengths, the cutting length is usually adjusted by varying the period or interval at which the web is cut. One important problem here is how to achieve complete synchronization of the cutter speed with the web feed speed, thereby minimizing dimensional error of the cut lengths.

A conventional web cutting machine will be described by way of example in connection with FIG. 1. The main shaft C if driven from main motor A through a reduction gearing having a belt B. The feed roller for the web is driven from the main shaft through a bevel gear D. The rotation of the main shaft C is also transmitted through a Reeves drive variable speed mechanism E to a synchronous fly mechanism F, the output of which is coupled to one roll of a rotary cutter G for sychronous drive with the other roll thereof. The speed of the rotary cutter is controlled by means of a motor H connected to the regulating part of Reeves mechanism E and that of synchronous fly mechanism F.

The conventional system provides some degree of synchronization between the web speed and the cutter speed since the rotation of the main shaft is transmitted both to the web feed roller and to the rotary cutter through these mechanisms. However, because of some slipping in the Reeves mechanism E and the complexity of the mechanisms, there is inevitably some cutting error due to transmission error between the elements. High cutting accuracy can not, therefore, be expected. Because both the Reeves mechanism and the synchronous fly mechanism are mechanical ones, the prior art system is slow to follow any change of the cutting length during operation, which results in substantial loss of material due to inaccurate cutting.

An object of the present invention is to provide a web cutting control system which utilizes modern electronics technology to control the speed of the rotary cutter, thereby bringing it into complete synchronization with the web running speed before the instant of cutting to ensure that the web is cut accurately into predetermined lengths or at fixed positions.

Another object of the present invention is to provide a web cutting control system which provides automatic, accurate and continuous cutting of a continuously conveyed web into predetermined lengths without interrupting the flow of web.

A further object of the present invention is to provide a control system making it possible to cut a web precisely on the marks which have been pre-printed thereon at a fixed or varying interval.

A still further object of the present invention is to provide a web cutting control system which facilitates the setting and change of the cutting length and permits such change even during operation.

The present invention consists in a web cutting control system which makes it possible to cut a web automatically, continuously and accurately either into digitally preset lengths or on the marks put thereon beforehand. These and other objects and advantages of the invention will become more apparent from the following description and drawings, in which:

FIG. 1 is a schematic illustration showing the operating principle of a conventional web cutting machine;

FIG. 2 is a schematic illustration, similar to FIG. 1, showing the operating principle of a web cutting control system embodying the present invention;

FIG. 3 is a schematic illustration showing the mounting position of three sensors relative to the rotary cutter;

FIG. 4 is a side view of the rotary cutter provided with the control system embodying the present invention;

FIGS. 8–12 are graphs showing how various signals change and are counted in each cutting cycle for fixed-position cutting; and FIGS. 13–20 are similar graphs showing the same for constant-size cutting. The mechanical and electrical arrangements of a preferred embodiment of the present invention are shown in FIGS. 2 – 6.

Figure 5:
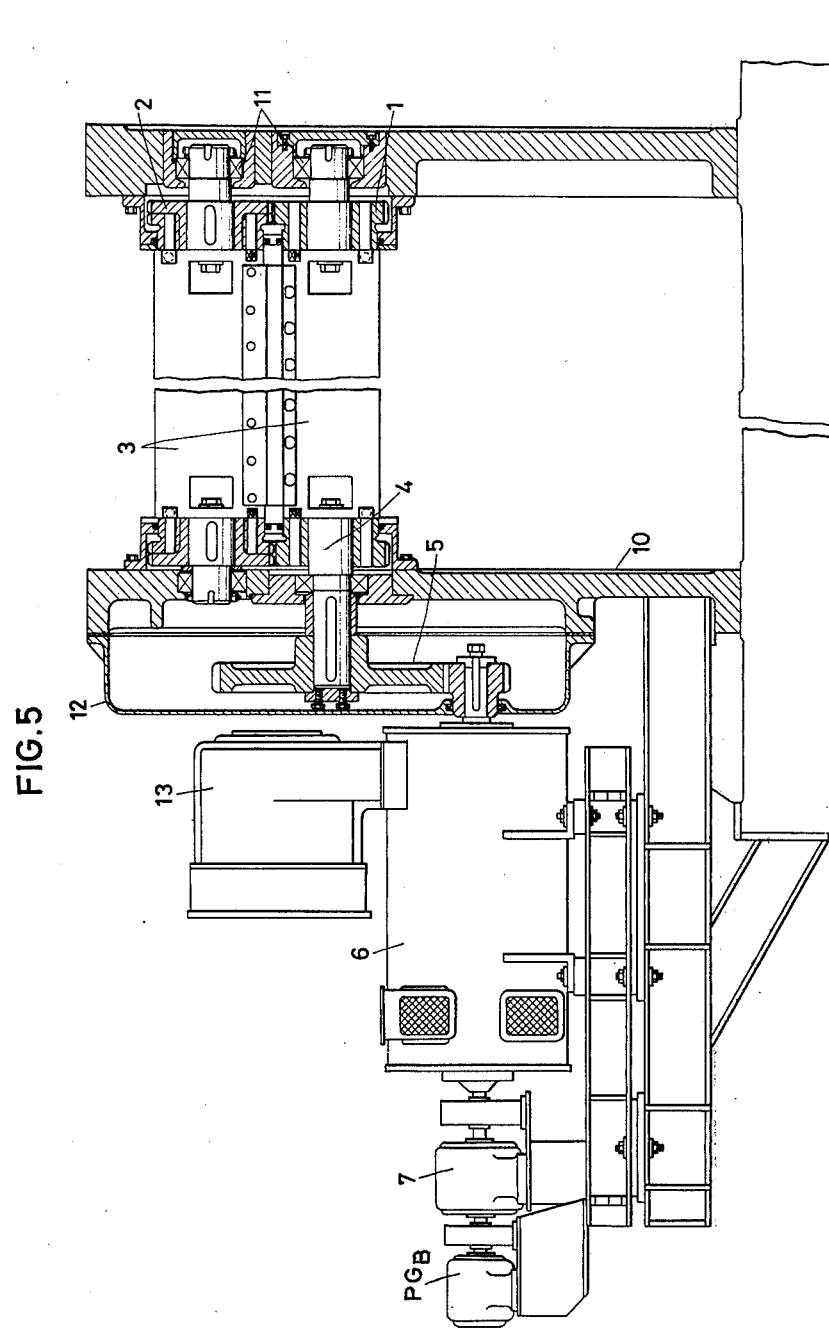
FIG. 5 is front view of the rotary cutter of FIG. 4.

A rotary cutter 3 has a pair of rolls coupled together by a pair of gears 1 and 2 for synchronous rotation. (FIG. 2) The main shaft 4 of the lower roll is provided with a reduction gearing 5 to which is coupled a DC motor 6. A tachometer generator 7 and a transducer $PG_B$ are connected to the other end of the DC motor 6 to detect the rotating angle of the rotary cutter 3. If the reduction gearing 5 has a reduction ratio of 4:1, for example, the rotary cutter 3 makes one revolution for each four revolutions of the motor 6. The transducer $PG_B$, coupled directly to the motor 6, generates two different pulse sequences 90° out of phase from each other each at a rate of 600 pulses for each revolution thereof.

A wheel 8 is kept in contact with the web X to be cut with a sufficient pressure to be driven by friction. To the shaft 9 of the wheel 8 is coupled a transducer $PG_A$ to detect the length of the web which has been fed. The transducer $PG_A$, too, supplies two different pulse sequences 90° out of phase from each other each at a rate of 3000 pulses for each revolution thereof.

As shown in FIG. 3, a sensor $OP_A$ (photoelectric tube) is provided at a distance $l_3$ ahead of the cutting point P to detect the cutting marks which have been pre-printed on the web at predetermined or varying spacings in fixed-position cutting.

Another sensor $OP_C$ is provided at a position where the cutting blades have moved a peripheral distance $L_1$ mm past the actual cutting point in the rotating direction, to detect completion of cutting and produce a web cutting completion signal C.

The reason why the sensor $OP_C$ for producing the cutting completion signal C is located not at the actual cutting point P but at $l_1$ mm past the point P (FIG. 3) is that if the cutter 3 were stopped simultaneously upon completion of cutting, it would have its blades caught in the web. In order to avoid this, the cutter 3 is designed to stop only after if has cut the web and through an additional angle.

Also, at a peripheral distance $l_2$ mm of the cutting point P along the periphery of the cutter 3 is located a third sensor $OP_B$ to detect the arrival of the tip of cutter blade to produce a mark distance discrimination signal.

Referring to FIGS. 4 and 5, the numeral 10 designates a frame; 11 are bearings for the rotary cutter 3; 12 is a cover for the gearing 5; 13 is a blower for cooling the motor 6; 14 are web feed rollers; and 15 is a fluid pressure cylinder for the wheel 8. The pressure at which the wheel 8 is pressed against the web X can be adjusted by means of the cylinder 15.

Figure 6:
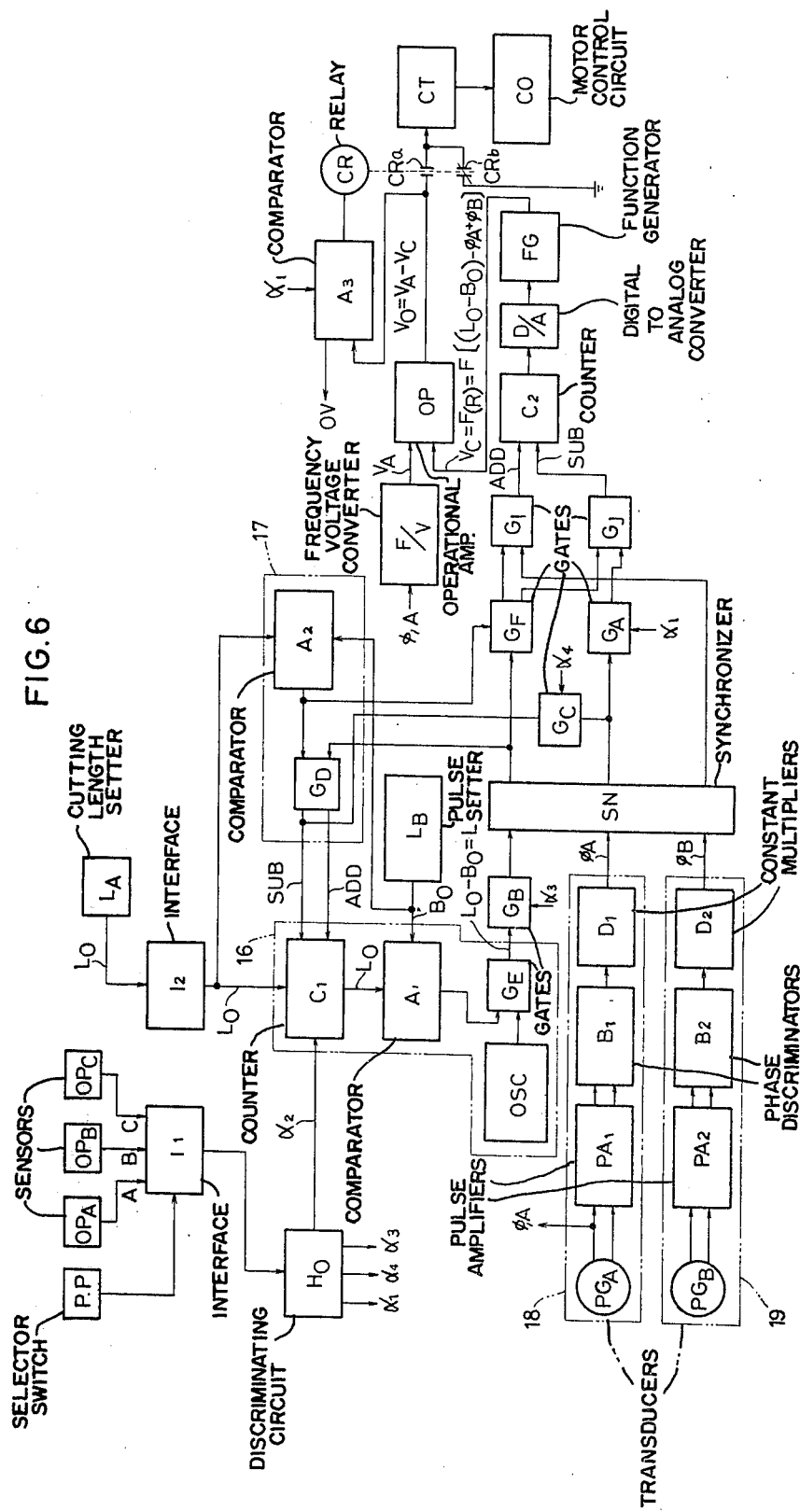
FIG. 6 is a block diagram of the control system embodying the present invention.

Referring to the block diagram of the control system shown in FIG. 6, a comparison unit 16 compares the value $L_0$ preset on the cutting length setter LA (digital switch) with the value $B_0$ preset on the reference pulse setter LB and feeds the difference therebetween ($L_0 - B_0 = L$), if any, to a counting circuit described later. The comparison unit 16 includes a reversible counter $C_1$ which counts the preset value $L_0$ from the cutting length setter LA, the comparator $A_1$ which compares the content $L_0$ of the counter $C_1$ with the value $B_0$ from the reference pulse setter LB to give any difference therebetween, and a gate $G_{E\ E}$ passes the difference signal in synchronization with the pulses from the pulse generator OSC. On the cutting length setter LA is set a desired cutting length in millimeters for constant-size cutting, or the distance between the cutting complete detection point and the mark detection point, that is, $l_1 + l_3$ mm (FIG. 3) for fixed-position cutting. On the reference pulse setter LB is set the number of pulses indicative of the circumference of the rotary cutter 3.

The numeral 17 designates an addition/subtraction discriminating circuit which compares the two preset values and couples the difference therebetween to the addition or subtraction input of the reversible counter $C_1$ according to the result of the comparison. This circuit 17 includes a comparator $A_2$ which compares the preset value $L_0$ from the cutting length setter LA with the preset value $B_0$ from the reference pulse setter LB to give an addition or subtraction command signal to a gate $G_D$ according to the result of comparison, and the gate $G_D$ which couples the signal fed from the gate $G_E$ back to the addition or subtraction input of the counter $C_1$ in response to the command signal from the comparator $A_2$.

A web flow detection circuit 18 detects the length of the web which has been fed to generate pulses, the number of which corresponds to the length. The circuit 18 includes the transducer $PG_A$ coupled to the wheel 8 in contact with the web, a pulse amplifier $PA_1$ for amplifying the pulses generated by the transducer $PG_A$, a phase discriminating circuit $B_1$ for discriminating the rotating direction of the transducer $PG_A$, and a constant multiplier $D_1$ which multiplies the number of pulses by a constant.

The generation of pulses from the circuit 18 is accomplished in the following manner in the preferred embodiment. As described above, the transducer $PG_A$ supplies two different pulse sequences 90° out of phase from each other, each at a rate of 3,000 pulses for each revolution thereof. Since the wheel 8 has a circumference of 1,200 mm, the web runs for 1,200 mm while the wheel 8 makes one revolution. In order to generate pulses at a rate of one pulse for each 0.1 mm of the web length, the two pulse sequences are combined and [(3000 + 3000) × 2] amplifier $PA_1$ and the phase discriminating circuit $B_1$. Thus, pulses, $\phi_A$, are supplied from the constant multiplier $D_1$ at a rate of 12,000 pulses for each revolution of the wheel 8 as a signal indicative of the web feed length.

A cutter rotating angle detection circuit 19 includes the transducer $PG_B$ coupled to the motor 6, a pulse amplifier $PA_2$a phase discriminating circuit $B_2$ and a constant multiplier $D_2$. In the preferred embodiment the constant multiplier $D_2$ is set as follows: Because of the gear ratio of 4:1, the rotary cutter 3 makes one revolution for each four revolutions of the motor 6 and thus the transducer $PG_B$. Since the rotary cutter 3 has a circumference of 864 mm, 8,640 pulses are required for each revolution thereof to produce pulses at the rate of one pulse for each 0.1 mm. For this purpose, two pulse sequences fed from the transducer $PG_B$ each at a rate of 600 pulses per revolution thereof are electrically combined and doubled as follows:

(600 PPR + 600 PPR) × 2 = 2,400 PPR

Thus, the number of pulses generated for four revolutions of the transducer $PG_B$ are 2,400 PPR × 4 = 9,600 PPR. The constant multiplier $D_2$ is set at 0.9 to convert this rate to 8,640 pulses per revolution of the cutter (8,640/9,600 = 0.9). Thus, 8,640 pulses produced as $\phi_B$ each time the transducer $PG_B$ makes four revolutions and the rotary cutter 3 makes one revolution.

The circuit configuration for fixed-position cutting will now be described. In this mode of cutting, th input signal (from a fixed-position cutting selector switch P.P) to the interface $I_1$ is kept on.

First, it will be explained how the distance between the marks is discriminated to be long-size or short-size. The logic for discrimination is which first comes, the mark detection signal A or the cutting completion signal C, after the mark distance discrimination signal B has arrived. To put this in another way, any length longer or shorter than $l_1 + l_3$ ($= L_0$) is discriminated to be long-size and short-size, respectively.

Figure 7:
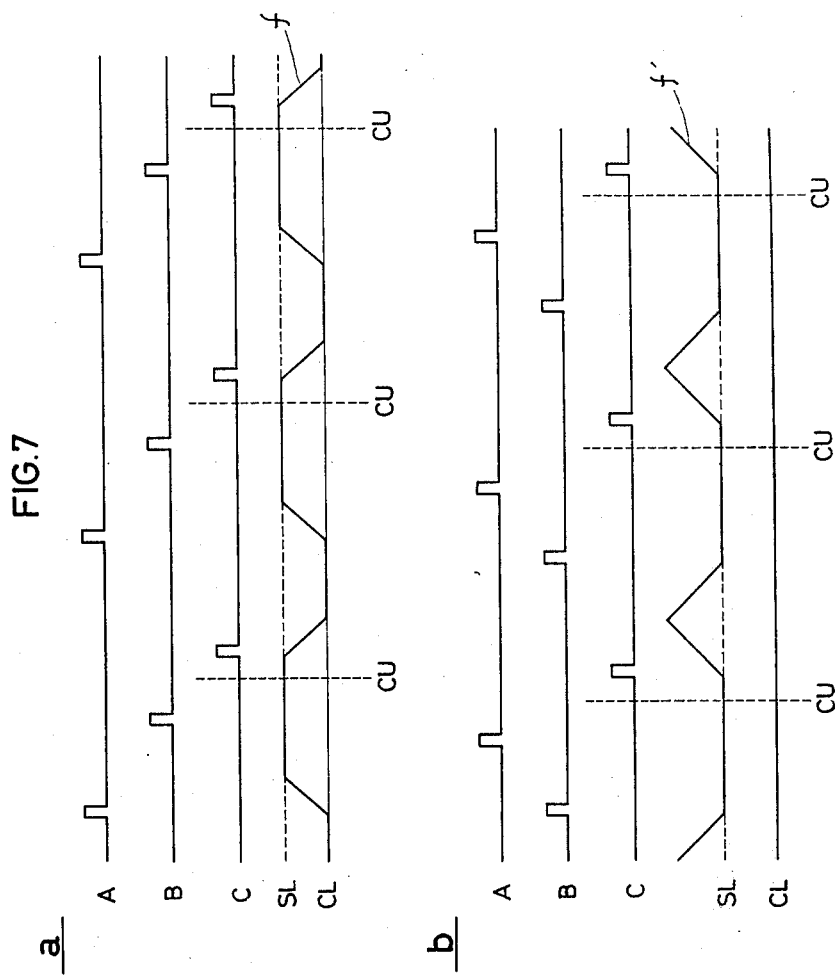
FIGS. 7a and 7b are wave form diagrams showing how the distance between the marks on the web is discriminated to be "long-size" or "short-size" in the fixed-positon cutting.

If first a cutting completion signal C and then a mark detection signal A comes after a mark distance discrimination signal B has been given as shown at (a) in FIG. 7, the control system will operate in the long-size cutting mode, in which an input signal discriminating circuit $H_0$ supplies signal $\alpha_1$ to close the gate $G_A$ throughout from the completion of cutting to the detection of the next mark. Thus, only the signal $\phi_B$ is stored in the reversible counter $C_2$ as a positive signal while signal $\phi_A$ is blocked at gate $G_A$. When a mark detection signal A comes from the sensor $OP_A$, the input signal discriminating circuit $H_0$ momentarily supplies signal $\alpha_2$ and resets signal $\alpha_1$ to open the gate $G_A$.

If first a mark detection signal A and then a cutting completion signal C are received after signal B, the control system will operate in the short-size cutting mode as shown at (b) in FIG. 7. In this mode, with a mark detection signal A, the input discriminating circuit $H_0$ supplies signal $\alpha_2$ momentarily. From the arrival of a mark detection signal A to that of a cutting complete signal C, it also supplies signals $\alpha_4$ and $\alpha_3$ to keep the gate $G_C$ open and the gate $G_B$ closed, respectively. With a cutting completion signal C, signals $\alpha_4$ and $\alpha_3$ are reset to close the gate $G_C$ and open the gate $G_B$.

The fixed-position cutting by the long-size cutting mode will be first described. When the interface $I_1$ receives a mark detection signal A from the sensor $OP_A$, the input discriminating circuit $H_0$ supplies a preset signal $\alpha_2$ to cause the reversible counter $C_1$ to store a value $L_0$ ($l_3$ mm $+ l_1$ mm) preset on the cutting length setter LA. The value $L_0$ is compared by the comparator $A_1$ with the value $B_0$ (indicative of the circumference of the cutter 3) preset on the reference pulse setter LB. When $L_0 - B_0$ becomes negative, the output of the comparator $A_1$ passes through the gates $G_E$ and $G_B$ in synchronization with the pulse from a reference pulse generator OSC. (The gate $G_E$ is designed to open when the output from the comparator $A_1$ is other than zero, and close only when it is zero.) It is a fed through the synchronizer SN to the gates $G_D$ and $G_F$.

On the other hand the comparator $A_2$ also compares $L_0$ with $B_0$ and sends a command to couple the output of gate $G_D$ to the addition input of the reversible counter $C_1$ as long as $L_0 - B_0 < 0$, to feed the signal from the gates $G_E$ and $G_B$ back to the reversible counter $C_1$ to add it to the value $L_0$ stored therein.

As soon as the output from the comparator $A_1$ becomes zero, the gate $G_E$ closes to stop the signal fed back to the counter $C_1$. This means that the remainder $L (L = L_0 - B_0)$ has been obtained by subtraction of the value $B_0$ indicative of the circumference of rotary cutter 3 from the preset value $L_0$.

The remainder thus obtained goes through the synchronizer SN to the gate $G_F$ which directs it through the OR gate $G_J$ to the reversible counter $C_2$ as a signal to be subtracted in coincidence with the signal fed from the comparator $A_2$ on the condition that $L_0 - B_0 < 0$.

Also, the output pluse $\phi_A$ from the web flow detection circuit 18 is fed through the synchronizer SN, gate $G_A$ and OR gate $G_J$ to the reversible counter $C_2$ as a signal to be subtracted. As shown in FIG. 8, the reversible counter $C_2$ thus receives these two signals every minute both as a subtraction signal to obtain $L - \phi_A$. On the other hand, as soon as one cutting operation is complete, pulses $\phi_B$ the number of which is proportional to the angle for which the rotary cutter 3 has rotated from the cutting completion detection point are applied as a signal to be added to the counter $C_2$ through the synchronizer SN and the OR gate $G_I$. Thus, the counter $C_2$ performs the following operation or reversible counting:

$$(L - \phi_A) + \phi_B, \text{ or } (L_0 - B_0) - \phi_A + \phi_B$$

These inputs are combined by the counter $C_2$ as graphically shown in FIG. 8, in which the arrows AD and SU indicate the addition and subtraction directions, respectively. Also, MP stands for the mark detection point and CP for the point where one cutting operation has been just completed. (These designations are used with the same meaning in all of the similar figures.)

The result of operation by the reversible counter $C_2$ is fed moment by moment through a digital/analog converter D/A to a function generator FG which outputs voltage, $V_C$, shown in FIG. 9-a, $$V_C = f(R) = f[(L_0 - B_0) - \phi_A + \phi_B]$$

As shown in FIG. 9-b, the output voltage $V_C$ is coupled to the operational amplifier OP which compares it with a voltage $V_A$ to determine the differential, $V_0 = V_A - V_C$. The voltage $V_A$ comes from a frequency-voltage converter F/V to which is fed pulse signal $\phi_{1A}$ proportional to the web running speed.

The output voltage $V_0$ is applied to the comparator $A_3$ to compare it with 0 volt to discriminate whether $V_0$ = $V_A - V_C < 0$ or $\geq 0$. Because $V_C$ is negative in this mode, $V_0 = V_A - (-V_C) = V_A + V_C > 0$. Therefore, the voltage $V_0$ is fed through the make contact $CR_a$ of the relay CR to the motor control circuit CO so that the DC motor 6 is accelerated.

As the equation $V_0 = V_A + V_C$ shows, the DC motor 6 rotates at a higher speed than the web feed speed by a value corresponding to $V_C$. Therefore, the input signal, $\phi_B$, the reversible counter $C_2$ increases at a higher rathe than $\phi_A$ as shown in FIG. 8, although the former is a signal to be added and the latter a signal to be subtracted.

At the point SS in FIG. 9-b where $V_C = (L_0 - B_0) - \phi_A + \phi_B = 0$, that is, $V_0 = V_A$, the speed of the rotary cutter 3 comes into complete synchronization with the web feed speed with the next mark and the cutter blades aqually spaced away from the cutting point. The web and the cutter move on in this condition unless there is any change in the web feed speed and the cutter speed, so that the web will be cut precisely on the mark. The graphs in FIGS. 8, 9-a and 9-b are summarized in FIG. 10.

If the speed of the DC motor 6 for the rotary cutter 3 should become so high that $(L_0 - B_0) - \phi_A + \phi_B$ is not zero any more but becomes positive, the speed command voltage $V_0 (= V_A - V_C)$ fed to the motor control circuit CO would not be equal to $V_A$ any more, but become smaller than $V_A$ proportional to the web speed. This means that the DC motor 6 decelerates until $V_C$ decreases to zero again.

Also, if the web feed speed should decrease, for example, $\phi_A$ would not increase so much as $\phi_B$ and $(L_0 - B_0) - \phi_A + \phi_B$ and thus the ouput voltage $V_C$ would become positive with the voltage $V_A$ once again, which means that the speed of the rotary cutter 3 comes into synchronization with the web feed speed.

Upon completion of one cutting operation, a cutting completion signal C from the sensor $OP_C$ is fed into the interface $I_1$. Simultaneously, the input discriminating circuit $H_0$ supplies signal $\alpha_1$ to close the gate $G_A$ to cut off the pulses $\phi_A$ from the web flow detection circuit 18, and forcibly make inoperative the relay CR in the comparator $A_3$ to restore the break contact $CR_b$ thereof to its open position.

Accordingly, the motor control circuit CO is connected to zero voltage through the delay circuit CT so that the motor 6 stops after a certain time. The rotary cutter 3 remains stopped until the next mark detection signal A arrives. The angle of rotation of the rotary cutter 3 from the completion of cutting to the actual stop thereof is stored in the reversible counter $C_2$ as signal $\phi_B$ from the cutter rotating angle detection circuit 19.

The cutting cycle in the fixed-position cutting is illustrated by line $f$ at $a$ in FIG. 7, in which the vertical dotted lines show the cutting points. When the horizontal dotted line SL is reached, the cutter speed comes into synchronization with the web speed. At the level of solid line CL, the rotary cutter 3 stops. The graph shows that the rotary cutter 3 is intermittently operated in the long-size cutting mode.

Next, cutting control in the short-size cutting mode will be described where the mark detection signal A is followed by the cutting completion signal C as shown at $b$ in FIG. 7. In this mode, signal flow in the control system is almost the same as in the long-size cutting mode except for the output signals from the input discriminating circuit $H_0$ and the operation of the gates $G_B$ and $G_C$ responsive thereto. When the interface $I_1$ receives first a mark detection signal A from the sensor $OP_A$ after it has received a mark distance discriminating signal B from the sensor $OP_B$ the input discriminating circuit $H_0$ produces preset signals $\alpha_2, \alpha_3$ and $\alpha_4$. With signal $\alpha_2$, the value $L_0$ preset on the setter LA is registered in the reversible counter $C_1$ through the interface $I_2$. Also, signal $\alpha_4$ opens the gate $G_C$ and signal $\alpha_3$ closes the gate $G_B$.

From the value $L_0$ stored in the counter $C_1$ is subtracted the pulses $\phi_A$ fed through the gate $G_C$ from the web flow detection circuit 18 until the web is cut on the last mark and the cutting completion signal C comes into the system.

In other words, if the next mark is detected by the sensor $OP_A$ before the web cutting on the last mark is complete, the distance between the marks is discriminated to be less than $l_1 + l_3$ mm shown in FIG. 3. With signal A from the sensor $OP_A$, the reversible counter $C_1$ is set to subtract from the preset value $L_0$ the length $\alpha$ which the web has run before the cutting completion signal C for the last mark enters. By performing this subtraction, the control system judges the web cutting size to be not $L_0$ but $Z (= L_0 - \alpha)$, the value Z being left in the counter $C_1$.

During the subtraction operation, the result of subtraction is not fed to the reversible counter $C_2$ because the gate $G_B$ has been closed by signal $\alpha_3$. The pulses $\phi_A$ and $\phi_B$ also continue to be fed to the cunter $C_2$ through the gate $G_A$ and OR gate $G_J$, and the OR gate $G_I$, respectively.

When the cutting completion signal C arrives from the sensor $OP_C$, the signals $\alpha_3$ and $\alpha_4$ from the input discriminating circuit $H_0$ disappear so that the gate $G_B$ opens whereas the gate $G_C$ closes. Operation thereafter is the same as in the long-size cutting mode except that the difference signal $Z - B_0$, not $L_0 - B_0$, is fed through the gate $G_F$.

Figure 11:
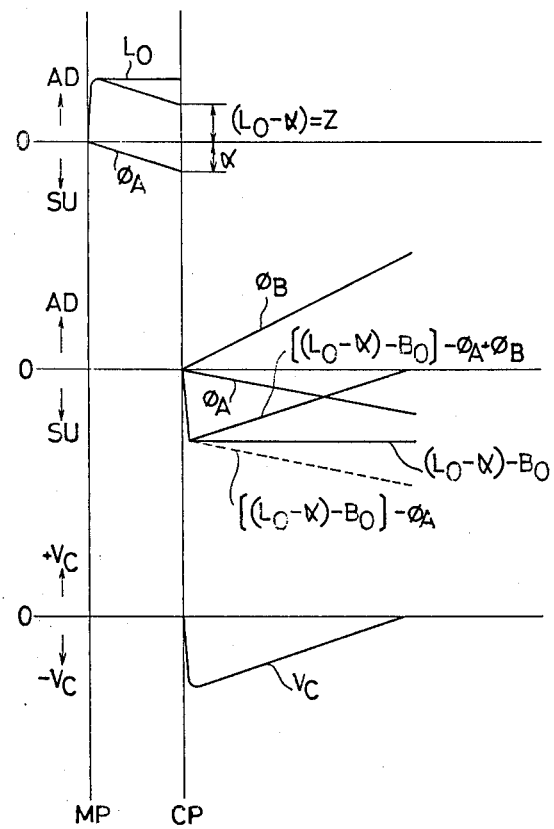
Figure 12:
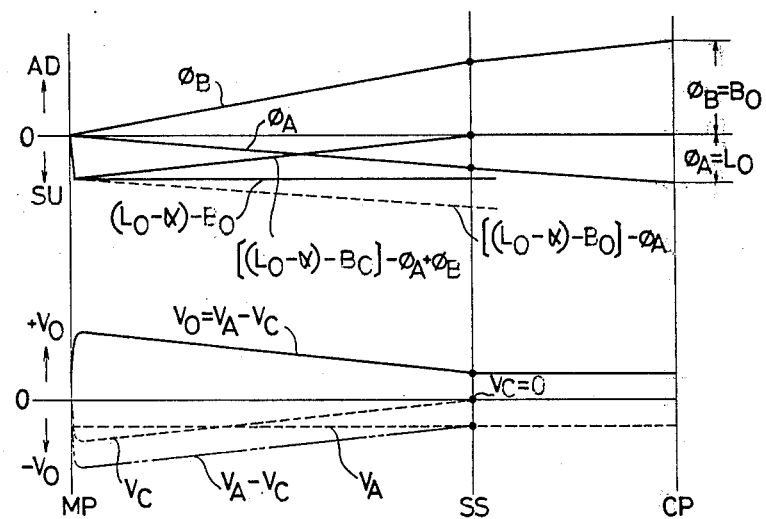

In the short-size cutting mode, the rotary cutter 3 continues to be driven at a speed equal to, or higher than, the web feed speed without intermittent stop as shown in line f' at b in FIG. 7. Speed control in the short-size cutting mode is graphically illustrated in FIGS. 11 and 12.

Constant-size cutting, another object of the present invention, will now be described.

In this control mode, the fixed-position cutting selector switch P.P, coupled to the interface $I_1$, is placed in its OFF position to shut out the signals A and B from the sensors $OP_A$ and $OP_B$ to keep the gates $G_A, G_B$ opened and the gate $G_C$ closed. Also, the web need not have marks placed thereon.

First, speed control will be explained in the case where the value $L_0$ preset on the cutting length setter LA is larger than, or equal to, the value $B_0$ on the reference pulse setter LB ($L_0 \geq B_0$). (In constant-size cutting, any desired cutting length may be set as $L_0$ on the cutting length setter LA, through $L_0 = l_1 + l_3$ mm in fixed-position cutting.)

Upon completion of cutting, the input discriminating circuit $H_0$ supplies signal $\alpha_2$ in response to signal C from the sensor $OP_C$. With signal $\alpha_2$ the preset value $L_0$ on the cutting length setter LA is stored in the reversible counter $C_1$ through the interface $I_2$. The value $L_0$ is compared by the comparator $A_1$ with the value $B_0$ preset on the reference pulse setter LB. Since $L_0 - B_0 > 0$ the gate $G_E$, to which is coupled the pulse generator OSC, opens to pass the output of the comparator $A_1$ to the gate $G_B$ in synchronization with the pulse from the reference generator OSC.

On the other hand, the comparator $A_2$ also compares $L_0$ with $B_0$ to couple the output of the gate $G_D$ to the subtraction input of the reversible counter $C_1$ while $L_0 - B_0 \geq 0$ to feed the output from the gate $G_E$ back to the counter $C_1$ to subtract it from the content thereof. In time, $L_0 - B_0$ will become zero so that the gate $G_E$ closes to stop the feedback signal for subtraction. This means that in the meantime, the difference signal $L = L_0 - B_0$ has been fed through the gates $G_E$ and $G_B$ toward the counter $C_2$. It is fed from these gates through the synchronizer SN to the gate $G_F$, which in response to the signal fed from the comparator $A_2$ on the condition that $L_0 - B_0 \geq 0$ directs it through the OR gate $G_I$ into the reversible counter $C_2$ as a signal to be added.

Figure 13:
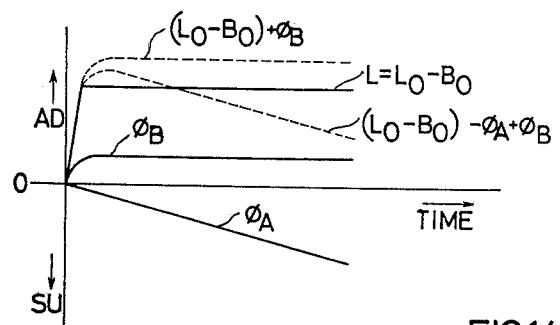

On the other hand, the pulses $\phi_A$ from the web flow detection circuit 18 are applied through the synchronizer SN, gate $G_A$ and OR gate $G_J$ to the counter $C_2$ as a signal to be subtracted. They are fed at a rate of one pulse for each 0.1 mm of web length as described above. Also, as the rotary cutter 3 rotates, the pulses $\phi_B$ corresponding to the rotating angle thereof from the cutting completion point are supplied through the synchronizer SN and the OR gate $G_I$ to the counter $C_2$ as a signal to be added. Thus, the counter $C_2$ performs the following operation or reversible counting: $(L_0 - B_0) - \phi_A + \phi_B$ These inputs are synthesized in the counter $C_2$ as graphically illustrated in FIG. 13.

Figure 14:
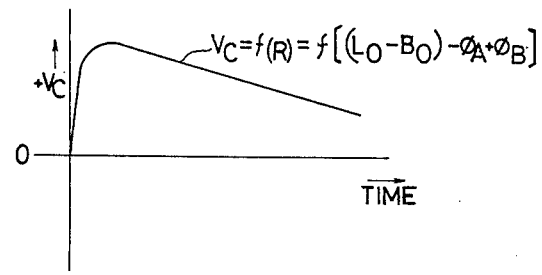

The result of operation by the counter $C_2$ is fed by the minute through the digital/analog converter D/A to the function generator FG, the output of which $V_C = f(R) = f[(L_0 - B_0) - \phi_A + \phi_B]$ is shown in FIG. 14.

As in fixed-position cutting, the output voltage $V_C$ is applied to the operational amplifier OP, which determines the differential $V_0$ between it and voltage $V_A$ from the frequency/voltage converter F/V ($V_0 = V_A - V_C$).

The resultant output voltage $V_0$ is fed to the comparator $A_3$ to compare it with O volts to discriminate whether $V_0 = V_A - V_C < 0$ or $\geq$ O. If $V_0$ is negative, the relay CR will not be actuated with the make contact $CR_a$ open as shown in FIG. 6 to block the input to the motor control circuit CO. If $V_0$ is positive, the relay CR will be actuated, the make contact $CR_a$ being closed to input the voltage $V_0$ from the operational amplifier OP to the motor control circuit CO.

Figure 15:
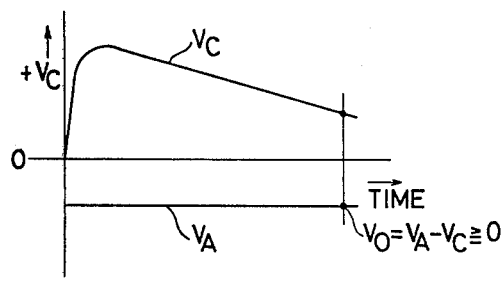

Since $L_0 - B_0$ is positive and thus the voltage $V_C$ is larger that $V_A$ at the cutting completion point, the output of the operational amplifier OP ($V_0 = V_A - V_C$) is negative so that the DC motor 6 is at standstill. As the web further runs with pulses $\phi_A$ increasing, the output, $V_C$, from the frequency generator FG decreases until it becomes equal to $V_A$ and thus $V_0$ becomes zero (FIG. 15), when the relay CR is actuated.

From then on, the motor 6 is made to run through the control circuit CO to drive the rotary cutter 3, pulses $\phi_B$ corresponding to the rotating angle thereof being fed again from the rotating angle detection circuit 19 through the synchronizer SN and the OR gate $G_I$ to the reversible counter $C_2$ as an addition signal. Since the pulses $\phi_B$ are smaller in number than the pulses $\phi_A$ indicative of the web feed length at this early stage, the output voltage $V_0$ from the operational amplifier OP increases to accelerate the DC motor 6 rapidly until the cutter speed follows the web feed speed.

At the point where $(L_0 - B_0) - \phi_A + \phi_B$ becomes zero, the rotary cutter speed will come into complete synchronization with the web feed speed with the cutter blades and the point of the web at which it is to be cut equally spaced from the cutting point. This condition remains unchanged unless there is any further change in the cutter speed or the web speed, so that the web is cut into a predetermined size $L_0$. FIG. 16 summarizes the graphs shown in FIGS. 13 to 15.

If there should be any change in the cutter or web speed, the cutter will be brought back to synchronization with the web feed speed in quite the same manner as in fixed-position cutting.

The manner in which the cutter speed is controlled will now be described in the case where the preset value $L_0$ on the cutting length setter LA is smaller than the preset value $B_0$ on the reference pulse setter LB $(L_0 - B_0 < 0)$.

In this case, too, signal flow in the control system is almost the same as in the above-mentioned case $(L_0 - B_0 \geq 0)$, but the gates $G_D$ and $G_F$ operate differently according to the result of discrimination by the comparator $A_2$.

With signal $\alpha_2$, the preset value $L_0$ on the cutting length setter LA is stored in the reversible counter $C_1$ through the interface $I_2$. The comparator $A_1$ compares $L_0$ with $B_0$ to discriminate $L_0 - B_0 < 0$. Accordingly, the gate $G_E$ opens to pass the output of the comparator $A_1$ to the gate $G_B$ in sychronization with the pulse from the reference generator OSC.

On the other hand, the comparator $A_2$ also compares $L_0$ with $B_0$ to couple the output of the gate $G_D$ to the addition input of the reversible counter $C_1$ while $L_0 - B_0 < 0$ to feed the signal from the gate $G_E$ back to the counter $C_1$ to add it to value $L_0$ therein. In time, $L_0 - B_0$ becomes zero so that the gate $G_E$ closes to stop the feedback signal for addition. This means that the difference signal $L = L_0 - B_0$ has been fed from the gates $G_E$ and $G_B$ toward the counter $C_2$. It is fed from these gates through the synchronizer SN to the gate $G_F$ which in response to the signal fed from the comparator $A_2$ on the condition that $L_0 - B_0 < 0$ directs it through the OR gate $G_J$ into the reversible counter $C_2$ as a signal to be subtracted.

In the meantime, as in the case where $L_0 - B_0 \geq 0$, pulses $\phi_A$ from the web flow detection circuit 18 are supplied to the counter $C_2$ as a subtraction signal, and pulses $\phi_B$ rom the rotating angle detection circuit 19 as a addition signal. Thus, the counter $C_2$ performs the following operation: $(L_0 - B_0) - \phi_A + \phi_B$.

As in the above described case, the result of operation by the counter $C_2$ is fed by the minute through the digital/analog converter D/A and the function generator FG to the operational amplifier OP, the output $V_0$ of which is compared with volts at the comparator $A_3$.

Figure 17:
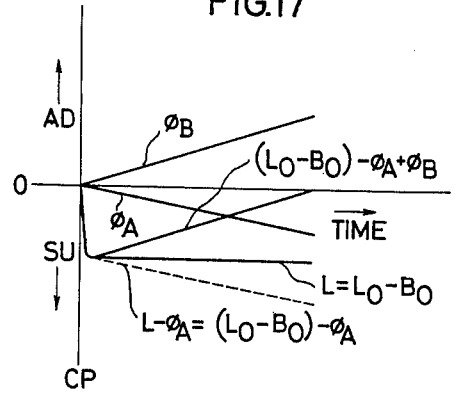

Because $V_C$ is negative in this case, $V_0 = V_A - (-V_C) = V_A + V_C > 0$. Therefore, the voltage $V_0$ is applied through the make contact $CR_a$ of the relay CR to the motor control circuit CO to accelerate the DC motor 6. As the equation $V_0 = V_A + V_C$ shows, the DC motor 6 rotates at a higher speed than the web feed speed by $V_C$. Therefore, the input signal, $\phi_B$, to the reversible counter $C_2$ increases at a higher rate than $\phi_A$ as shown in FIG. 17, although the former is a signal to be added and the latter a signal to be subtracted.

At the point SS in FIG. 19 where $V_C = (L_0 - B_0) - \phi_A + \phi_B = 0$, that is, $V_0 = V_A$, the speed of the rotary cutter 3 comes into complete synchronization with the web feed speed with the cutter blades and the point at which the web is to be cut equally away from the cutting point. The rest is the same as in the above described case $(L_0 - B_0 \geq 0)$. The graphs in FIGS. 17 to 19 are summarized in FIG. 20.

The present invention makes possible continuous, automatic cutting of the web on the marks thereon or into predetermined lengths by means of the above-mentioned arrangement. The control system embodying the present invention has the following advantages over the conventional control systems described at the beginning of the specification:

1. The length into which the web is to be cut is manually set on a digital switch. This setting may be readily and instantaneously changed even during operation without producing any appreciable material loss.

2. Electronic control by means of digital and analog control systems provides high accuracy with a minimum of cutting error and makes possible control of the cutting length setting by any external signal (from an electronic computer, for example).

3. The speed of a rotary cutter used is electronically brought into synchronization with the web feed speed and kept in such a state until the instant of cutting. This assures not cutting error and provides an extremely simple mechanical arrangement compared with the prior art system in which this synchronization was achieved by mechanical means. Directly coupled to a DC motor through a gearing, the rotary cutter has a driving which is very simple in construction.

4. The web is cut by detecting the marks pre-printed thereon by means of a mark detection sensor. Therefore, independently of the size between the marks, the web is cut precisely on the marks.

5. If there should arise any change in the web feed speed, the control system causes the rotary cutter to follow it automatically because the web feed speed is converted to a voltage for use as a reference voltage. Such a change cannot, therefore, interfere with precise cutting.

6. The electronic control system with extremely simple mechanical construction provides noiseless, stable cutting control.

7. Three sensors are provided to discriminate the distance between the marks to be long-size or short size according to the order in which signals come therefrom. This assures that independently of the distance between the marks, the web is precisely cut on the marks.

What is claimed is:

1. A control system for cutting a web fed at a constant speed by means of a rotary cutter driven by a motor selectively either into predetermined lengths or at fixed positions thereof, said control system comprising in combination:
 a. first transducer for generating pulses, the number thereof being proportional to the length of the web which has been fed;
 b. a second transducer for generating pulses, the number thereof being proportional to the angle through which said rotary cutter has rotated;
 c. a first setting means for setting reference pulses, the number thereof being predetermined by a fixed rotating angle of said rotary cutter;
 d. a first sensor for detecting the marks put beforehand on the web to give a mark detection signal;

e. a second sensor for detecting completion of each cutting operation to give a cutting completion detection signal;

f. a third sensor for giving a mark distance discriminating signal for discrimination whether the detection of the next mark occurs before or after the completion of cutting on the last mark;

g. a second setting means for digitally setting selectively either a desired cutting length or the distance between the mark detection point and the cutting completion detection point;

h. a first reversible counting means responsive to a detection signal from said first sensor for counting any difference between the value preset on said first setting means and the value preset on said second setting means;

i. an addition/subtraction discriminating means for comparing the value from said first setting means with the value from said second setting means to couple said difference between said two values to said first reversible counting means as a signal to be added or a signal to be subtracted according to the result of comparison;

j. said first reversible counting means receiving the pulses from said first transducer as a signal to be subtracted and the pulses from said second transducer as a signal to be added as well as the difference between said two values and performing reversible counting thereof;

k. a differentiating means for obtaining any difference between the result of said reversible counting by said first reversible counting means and a voltage proportional to the web feed speed;

l. a motor speed control means for discriminating the polarity of the output voltage from said differentiating means and controlling the speed of the motor for driving the rotary cutter according to the polarity and quantity of said output voltage; and m. a second reversible counting means for subtracting from the preset value on said first sensing means a value corresponding to the length of the web which has been fed from the instant of detection by said first sensor to the instant of detection by said second sensor, in case the mark detection signal from said first sensor arrives inn advance of the cutting completion detection signal from said second sensor after the mark distance discriminating signal has come from said third sensor.

* * * * *